(12) United States Patent
Breton

(10) Patent No.: US 12,556,442 B2
(45) Date of Patent: Feb. 17, 2026

(54) EFFICIENT FAIL OVER TO BACKUP LINK

(71) Applicant: Adeia Media Holdings LLC, San Jose, CA (US)

(72) Inventor: Bernard Breton, Gatineau (CA)

(73) Assignee: Adeia Media Holdings LLC, San Jose, CA (US)

(*) Notice: Subject to any disclaimer, the term of this patent is extended or adjusted under 35 U.S.C. 154(b) by 167 days.

(21) Appl. No.: 17/449,495

(22) Filed: Sep. 30, 2021

(65) Prior Publication Data

US 2023/0100301 A1   Mar. 30, 2023

(51) Int. Cl.
| | |
|---|---|
| *H04L 41/0663* | (2022.01) |
| *H04L 41/0604* | (2022.01) |
| *H04L 41/0668* | (2022.01) |
| *H04L 43/0823* | (2022.01) |

(52) U.S. Cl.
CPC ...... *H04L 41/0663* (2013.01); *H04L 41/0627* (2013.01); *H04L 41/0668* (2013.01); *H04L 43/0847* (2013.01)

(58) Field of Classification Search
CPC ............ H04L 41/0663; H04L 41/0627; H04L 41/0668; H04L 43/0847; H04L 43/0882; H04L 43/10
USPC ........................................................ 370/216
See application file for complete search history.

(56) References Cited

U.S. PATENT DOCUMENTS

| | | | |
|---|---|---|---|
| 7,822,837 B1 * | 10/2010 | Urban ..................... | H04L 43/00 |
| | | | 709/223 |
| 8,270,314 B2 | 9/2012 | Finn et al. | |
| 9,577,873 B2 * | 2/2017 | Kayser .................. | H04L 45/125 |
| 9,769,131 B1 * | 9/2017 | Hartley ............... | H04W 12/033 |
| 10,366,712 B1 | 7/2019 | Singh | |
| 10,972,387 B2 | 4/2021 | Iyer et al. | |
| 10,992,568 B2 | 4/2021 | Michael et al. | |
| 2018/0270139 A1 * | 9/2018 | Singh ................ | H04W 72/0453 |
| 2019/0215385 A1 * | 7/2019 | Ethier .................. | H04L 45/123 |
| 2019/0280917 A1 * | 9/2019 | Hughes ............... | H04L 43/0811 |
| 2019/0288937 A1 | 9/2019 | Quinquis et al. | |
| 2019/0373660 A1 * | 12/2019 | Travostino .............. | H04L 43/10 |
| 2021/0126870 A1 * | 4/2021 | Thiel ...................... | H04L 47/12 |
| 2021/0234775 A1 | 7/2021 | Devadoss et al. | |

OTHER PUBLICATIONS

International Search Report dated Dec. 6, 2022 for corresponding International Application No. PCT/CA2022/051431.
Written Opinion of the International Searching Authority dated Dec. 6, 2022 for corresponding International Application No. PCT/CA2022/051431.

* cited by examiner

*Primary Examiner* — Kwang B Yao
*Assistant Examiner* — Syed M Bokhari
(74) *Attorney, Agent, or Firm* — HG Law LLP

(57) ABSTRACT

A system and method for efficient fast failover of a primary link to a secondary link comprising monitoring an amount of user packets on said primary link and sending synthetic packets on said secondary link at a predetermined rate based on said amount of user packets wherein said predetermined rate is changed as a function of change in said amount of user packets.

14 Claims, 2 Drawing Sheets

EFFICIENT FAIL OVER TO BACKUP LINK

BACKGROUND

In telecommunication networks, as per FIG. 1, there is often a need to have a backup link 108 in case a primary link 106 fails. The primary link 106 and backup link 108 connect a networking device 102 to the network 104. The primary link 106 and backup link 108 may be wired or wireless.

In the case of a wireless backup link 108, the networking device 102 must keep the backup link 108 active by sending synthetic packet 112 at regular intervals while the data packets 110 are sent over the primary link 106. Otherwise the connection could be torn down and the fail over from the primary link 106 will take a long time.

The interval between synthetic packets is generally short (e.g. 100 msec), which means it generates a lot of bandwidth on the secondary link. Since the secondary link is generally wireless and pay-by-use, this method of keeping the secondary link active is not efficient and can be costly.

In general, the networks carry packets with different priority. For example, voice and video packets are generally carried with higher priority than data packets. This means the network elements that are traversed by the higher priority packets to reach their destination are treated preferentially to the lower priority packets. Note that there can be more than two priorities of packets carried by a network and preference can also be given based on the applications used to transmit the packets. For example, Transmission control Protocol (TCP) or User datagram protocol (UDP) can be used as protocol to transmit data packets and a higher priority can be assigned to UDP traffic over TCP traffic, since UDP protocol does not have retransmit.

There is a need to keep a backup link 108 active with an efficient protocol.

BRIEF SUMMARY

In a first embodiment, a method for efficient fast failover of a primary link to a secondary link is disclosed. The method comprises monitoring an amount of user packets on the primary link and sending synthetic packets on the secondary link at a predetermined rate based on the amount of user packets wherein said predetermined rate is changed as a function of change in the amount of user packets.

In another embodiment, the primary link is a fixed link and the secondary link is a wireless link.

In another embodiment, the monitoring said amount of user packets counts only packets of high priority.

In another embodiment, a system for efficient fast failover of a primary link to a secondary link is disclosed. The system comprises a network device monitoring an amount of user packets on the primary link and wherein the network device sending synthetic packets on the secondary link at a predetermined rate based on the amount of user packets wherein the predetermined rate is changed as a function of change in the amount of user packets.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
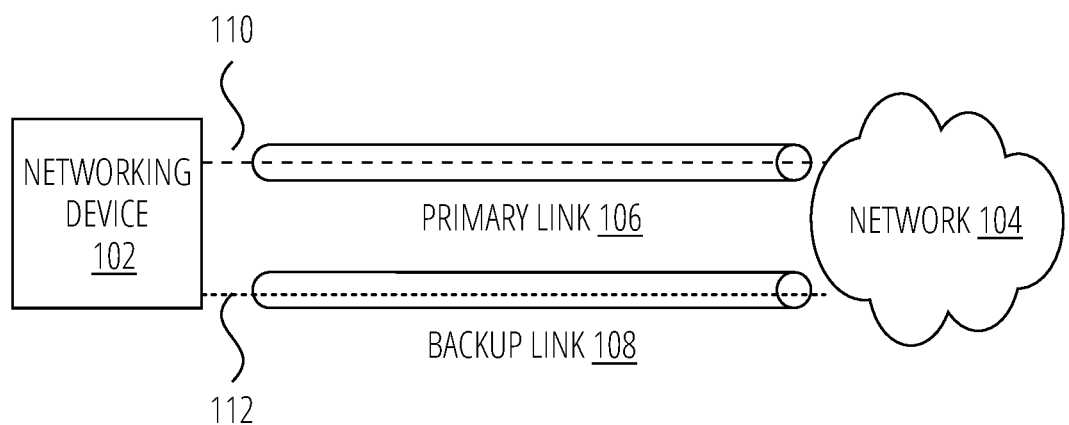
FIG. 1 illustrates existing art on handling primary and backup links.
Figure 2:
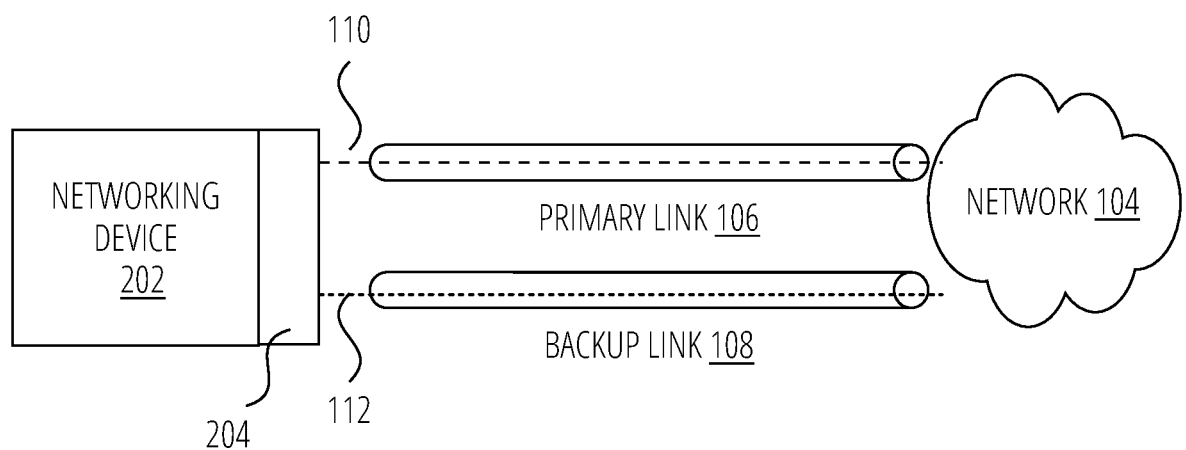
FIG. 2 illustrates an embodiment of efficient fail over.

In one embodiment, the networking device 102 comprises a backup link keep alive 204 system. The backup link keep alive 204 monitors the rate of data packets 110 sent on the primary link 106. The backup link keep alive 204 system sends synthetic packet 112 to the backup link 108 at a rate proportional to the amount of data packets 110 on the primary link 106. Thus, when the primary link 106 is lightly utilized, there are less synthetic packet 112 sent on the backup link 108 and when there is a lot of traffic on the primary link 106, more synthetic packet 112 are sent on the backup link 108 to ensure that a failover happens within expected delays.

For example, the networking device 102 sends 1 synthetic packet 112 for every 1000 data packets 110 sent on the primary link 106. Another example, the networking device 102 monitors the rate at which data packets 110 are sent on the primary link 106 and sends the synthetic packet 112 at a rate of 0.1% of the rate of the data packets 110. As the rate of data packets 110 changes, the rate of synthetic packet 112 changes.

In another embodiment, the backup link keep alive 204 system analyses the priority of data packets 110 sent on the primary link 106. The amount of synthetic packet 112 sent to the backup link 108 is proportional to the high priority data packets 110 sent on the primary link 106 instead of all the type of data packets 110. This embodiment allows to further reduce the amount of backup link 108 bandwidth utilized by synthetic packet 112.

For example, the networking device 102 sends 1 synthetic packet 112 for every 1000 high priority data packets 110 sent on the primary link 106. Another example, the networking device 102 monitors the rate at which high priority data packets 110 are sent on the primary link 106 and sends the synthetic packet 112 at a rate of 0.1% of the rate of the data packets 110. As the rate of data packets 110 changes, the rate of synthetic packet 112 changes.

In another embodiment, the backup link keep alive 204 system analyses the type of data packets 110 sent on the primary link 106. The amount of synthetic packet 112 sent to the backup link 108 is proportional to the amount of data packets 110 of voice and video type sent on the primary link 106 instead of all the type of data packets 110. This embodiment allows to further reduce the amount of backup link 108 bandwidth utilized by synthetic packet 112.

The embodiments described above can be used with any networking protocols, such as, but not limited to UDP, TCP that are used on the primary link 106 and backup link 108 to communicate with the network 104.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU). Computers suitable for the execution of a computer program include, by way of example, general or special purpose microprocessors or both, or any other kind of central processing unit. Generally, a central processing unit receives instructions and data from a read-only memory or a random-access memory or both. A computer can also include, or be operatively coupled to receive data from, or transfer data to, or both, one or more mass storage devices for storing data, e.g., optical disks, magnetic, or magneto optical disks. It should be noted that a computer does not require these devices.

What is claimed is:

1. A method for managing synthetic packet transmission on a backup link, the method comprising:
   determining a first rate of data packets on a primary link;
   based at least in part on the first rate of data packets:
      determining a first synthetic packet rate based at least in part on the first rate of data packets on the primary link, wherein the backup link is configured to be activated to carry data traffic in case of a degradation of the primary link; and
      keeping the backup link alive by sending, on the backup link, synthetic packets at the determined first synthetic packet rate; and
   determining a second rate of data packets on the primary link, wherein the second rate of data packets is different from the first rate of data packets;
   based at least in part on the determined second rate of data packets on the primary link:
      determining a second synthetic packet rate different from the first synthetic packet rate; and
      sending, on the backup link, synthetic packets at the determined second synthetic packet, wherein the second synthetic packet rate is determined as a function of the second rate of data packets on the primary link.

2. The method of claim 1, wherein the primary link is a fixed link and the backup link is a wireless link.

3. The method of claim 1, wherein the detecting the rate of the data packets on the primary link counts only packets of high priority.

4. The method of claim 1, wherein the synthetic packet rate is based directly on a rate at which data packets are sent on the primary link.

5. The method of claim 1, wherein an amount of the synthetic packets sent on the backup link is proportional to an amount of high priority data packets on the primary link.

6. The method of claim 1, wherein an amount of the synthetic packets sent on the backup link is proportional to an amount of voice and video type data packets on the primary link.

7. The method of claim 1, wherein the synthetic packets are sent such that the failover of the primary link to the backup link is within an expected delay.

8. A network device system for managing synthetic packet transmission on a backup link, the network device system comprising a network device comprising: a memory configured to store instructions; and a control unit configured to access the instructions in the memory and to: determine a first rate of data packets on a primary link; based at least in part on the first rate of data packets: determine a first synthetic packet rate based at least in part on the first rate of data packets on the primary link, wherein the backup link is configured to be activated to carry data traffic in case of a degradation of the primary link; and keep said backup link alive by sending, on the backup link, synthetic packets at the determined first synthetic packet rate; determine a second rate of data packets on the primary link, wherein the second rate of data packets is different from the first rate of data packets; based at least in part on the determined second rate of data packets on the primary link: determine a second synthetic packet rate different from the first synthetic packet rate; and send, on the backup link, synthetic packets at the determined second synthetic packet, wherein the second synthetic packet rate is determined as a function of the second rate of data packets on the primary link.

9. The system of claim 8, wherein the primary link is a fixed link and the backup link is a wireless link.

10. The system of claim 8, wherein the detecting the rate of data packets on the primary link counts only packets of high priority.

11. The system of claim 8, wherein the synthetic packet rate is proportional to the detected rate of the data packets on the primary link.

12. The system of claim 8, wherein the synthetic packet rate is based directly on the detected rate at which the data packets are sent on the primary link.

13. The system of claim 8, wherein an amount of the synthetic packets sent on the backup link is proportional to an amount of high priority data packets on the primary link.

14. The system of claim 8, wherein an amount of the synthetic packets sent on the backup link is proportional to an amount of voice and video type data packets on the primary link.

* * * * *